(No Model.)
E. A. SPERRY.
SYSTEM OF CONTROL FOR ELECTRIC MOTORS.
No. 569,305. Patented Oct. 13, 1896.
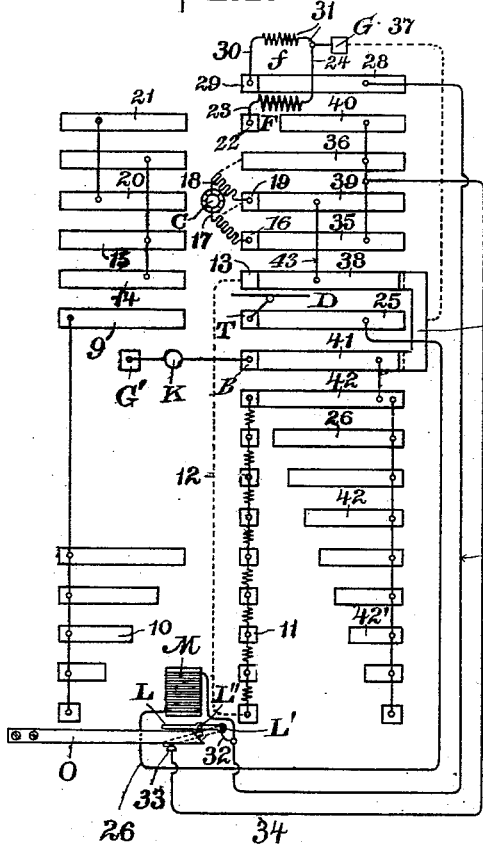
WITNESSES.
A. H. Abell.
A. B. Macdonald.
INVENTOR.
Elmer A. Sperry
By his Attorney

UNITED STATES PATENT OFFICE.

ELMER A. SPERRY, OF CLEVELAND, OHIO, ASSIGNOR TO THE GENERAL ELECTRIC COMPANY, OF NEW YORK.

SYSTEM OF CONTROL FOR ELECTRIC MOTORS.

SPECIFICATION forming part of Letters Patent No. 569,305, dated October 13, 1896.

Application filed February 21, 1895. Serial No. 539,297. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Electric Brakes, of which the following is a specification.

My invention relates to systems of control for electric motors; and it consists in organization of circuits and devices for manipulating such circuits whereby the motor may be either supplied with current from a source of electric supply, so as to operate as a motor, or one or more of its field-coils may be energized from the said source of supply while the terminals of the motor are changed so as to operate as a generator when the main or any subsidiary circuit is closed; and it further consists in the employment of automatic means for transferring the coil or coils upon the motors from one to another source of electrical supply or potential, whereby they may derive energy from one automatically upon the failure of the other or others.

In my application, Serial No. 539,019, filed February 19, 1895, I have shown and described an auxiliary field-coil for the purpose of maintaining a certain amount of field magnetization for a dynamo-electric machine which is used for propelling and braking a vehicle. This magnetization is maintained at the interval between the shutting off of the source of supply and the completion of the circuit through the generator and electric brakes.

I do not herein claim, broadly, the use of the auxiliary field-coil, but limit myself to an auxiliary field-coil which is automatically shifted from one source of power to another.

To this end devices are shown, principally in diagram, which exhibit one method of carrying out my invention. These are fully described in the specification, pointed out in the claims, and shown in the drawings, in which—

Figure 1 is a diagrammatic view of the controller, showing the three sets of contacts, consisting of the center row, which is usually the stationary contact, and a set of contact-plates upon both sides thereof, those on the left being shown as entirely isolated from the circuit, while some of the set of contact-plates on the right are shown in contact with the first-named or central set of contacts. Fig. 2 illustrates a diagrammatic view of the motor, windings, and circuits connected thereto. Figs. 3 and 4 are diagrams of the circuit connections when the motor is normally operating as such and deriving its current from a trolley or other source of electrical supply, the motor running oppositely in the two figures. Figs. 5 and 6 are diagrams of the circuits of the motor when the controller stands in its off position, but after the elements have been reversed from their respective positions shown in Figs. 3 and 4, so as to act as motors, the circuit through the main field-coil being broken, but that through the shunt-coil being closed to the source of electrical supply and ground or equivalent return connection. The motors are shown as running oppositely in the two figures. It will be understood that the armatures in these figures are open-circuited. Figs. 7 and 8 represent the controller still in position as shown in Fig. 1, but where the trolley or other connection to the source of electrical supply has been broken, and where the connection of the coil of high resistance of the said motor has been automatically transferred to the armature-circuit and receives its current supply therefrom, the main field-coil being still out of circuit, the armatures running oppositely in the two figures. Fig. 9 is a detail view of the reversing-switch.

Like letters and numerals of reference indicate similar parts throughout the several views.

A represents the armature which revolves in the fields B', receiving magnetization from the coils F F, which constitute the main field-coils of the machine, and also from coils $ff$, which constitute the field of high resistance of the machine. Suitable circuit-wires are shown connecting and leading to these coils and to the commutator C.

If the machine is to be operated as a motor, the set of contact-plates shown in Fig. 1 to the left will be brought in contact with the middle set by the changing in position or movement of either of the sets of contacts, as will readily be understood; but for the purposes herein it is preferred that the central row remain stationary and that the elongated plates on either side thereof constitute the moving sets hereinafter referred to. Under these conditions the current emanating at D would flow to contact T, plate 9 down to the connected plates, whichever be the lower in contact with the central row, for example, plate 10. Thence the current would flow to contact 11 down through the resistances R R to the lower contact, which is coupled by a wire 12 to contact 13, thence to contact-plate 14, cross-connected to plate 15, contact 16, commutator-brush 17, commutator C, brush 18, contact 19, plate 20, plate 21, contact 22, field F by wire 23 to the ground G by wire 24. When, however, the moving parts of the controller are turned in the opposite direction, so that the center row of contacts shall be in the position and connection as shown in the drawings, it will be seen that the circuit relation of the field and armature have been reversed in readiness for the motor to act as a generator whenever necessary or whenever the proper circuit connections are closed, and it will be further seen that the said source of electrical supply D will now operate to supply the field of high resistance $f$, the circuit connections of which may be traced as follows: The current arriving at contact T flows out on contact-plate 25 to wire 26, magnet M, wire 27, to contact-plate 28, thence to contact 29, wire 30, field $f$, and the wire 31 to the ground G. It will be noticed that the wire 27 receives a connection 32 to armature-lever or contact L, pivoted at L' and provided with a laterally-projecting pin L'', which is made to coöperate with the beveled end and top edge of the lifter O. It may be stated that either the magnet M or its armature L moves with the controller and the lifter O remains stationary, or the lifter may move and the other parts remain stationary, either serving the purpose hereinafter specified. Coöperating with the armature or lever L or a contact thereon will be found the contact 33, connecting by wire 34 to the armature-plates 35 and 36, the current flowing in one of these to the armature, the particular one being determined by the position of the contacts 16 and 19.

The diagrams in Figs. 5 and 6 are given to illustrate more clearly the circuit connections which have just been traced.

In Fig. 9 is shown a detail view of the reversing-switch. The brushes 16 and 19 are mounted on an insulated support and are adapted to be moved up and down by means of lever P, so they may engage with contacts 35 and 39, as shown, or with 36 and 39. By tracing the connections through the armature and field it will be seen that the relations are reversed whenever the brushes are shifted from the position shown to that described above.

It will be seen that the magnet M, so long as the current from the trolley or other source persists, will hold its armature L out of contact with terminal 33, as shown in said Figs. 5 and 6. Should, however, the magnet M lose its magnetization for any cause whatever, the armature L will fall to its position shown in dotted lines in Fig. 1, whereupon the circuit relations shown in Figs. 7 and 8 will be obtained and the high-resistance field-coil $f$ will receive current from the armature A, which is now coupled as a generator, the current flowing in the circuits as follows, (see Fig. 1:) Current emanating at brush 17 will flow to contact 16, plate 35, wire 34, contact 33, lever L, wire 32, wire 27, contact-plate 28, contact 29, wire 30, field $f$, wire 31 to the ground contact G, which is usually coupled to wire 37, to shunting-contact S, plate 38, to plate 39, contact 19, brush 18, commutator C, to the point of starting. Thus it will be seen that the coil $f$ continues to receive energy, but from a different source, the change having been effected automatically and from any cause, as, for instance, the failure at the source of supply D.

If the controller is so operated that the contacts to the right are brought farther into contact with the central row, it will be seen that the last-named series of connections will be unaltered, except that the contact-plate 40 will have caused the field F to have been brought into circuit through the contact 22, the current then passing to ground G by wire 24. The shunt-contact S having been broken it will be seen that the current will flow from ground G to G' and pass through the brake-magnet K to contact B, plate 41, to such of the plates 42, &c., as are in contact with the central row, for instance, contact 42', connecting with contact 11, the current then passing by the resistances R R, wire 12, contact 13, contact-plate 38, wire 43, contact-plate 39, contact 19, commutator-brush 18, to commutator C, the point of starting. During all of this time the trolley may be supplying the shunt-coil $f$ with current, as per diagram, Figs. 5 and 6, or the contact 25 may be short, so that the trolley will be disconnected from the field $f$ as soon as the central row of contacts advance toward the right. The same effect will be produced if the contact 28 was short; but this is a matter of detail and not essential to the present invention, the operation of which will be readily understood from the foregoing without it being further pointed out or discussed.

One point connected with the automatic return of the lever L to its position in proximity to the magnet M will be readily understood. The beveled extremity of the lifter O is so positioned with reference to the moving contacts that the lever L is held out of contact with terminal 33 whenever the motor is being normally operated as such and is held in contact while removing such motor from circuit until the circuit relations through the magnet M are established, whereupon the upper edge of the lifter O has passed from under the pin L" and the magnet M forms the total support for the lever L, which will from that time on hold the same out of contact with terminal 33, unless the current from the supply should cease and it become necessary to establish relations with the new source of supply, as has been fully pointed out.

The shunting device S is adapted to connect the contact-plates 38 and 41 when the controller is in the position shown in Fig. 1: Its object is to insure an initial magnetization to the field of the generator before the brake K is included in circuit.

Having fully described my invention, what I claim as new, and desire to secure by Letters Patent, is—

1. In an electric controller, a source of electrical supply, a series electric machine, an independent field-coil of high resistance for such machine, the controller adapted to assume a position wherein the main circuits are open, in combination with contacts so located in the controller that at the above position of the controller the source of supply is connected with the field-coil of high resistance.

2. In an electric controller a source of electrical supply, a series electric machine, an independent field-coil of high resistance for such machine, the controller adapted to assume a position wherein the main circuits are open, contacts so located in the controller that at the above position of the controller the source of supply is connected with the field-coil of high resistance, in combination with means responsive to an electric current for holding an electric circuit open.

3. In an electric controller, a source of electrical supply, a series electric machine, an independent field-coil of high resistance for such machine, the controller adapted to assume a position wherein the main circuits are open, contacts so located in the controller that at the above position of the controller the main source of supply is connected with the field-coil of high resistance, in combination with means responsive to an electric current for transferring the high-resistance field-coil to the said main circuit.

4. In an electric-brake system, the combination of means for placing the motor in operative connection with a source of electrical supply so as to be driven as a motor, contacts for connecting the source of electrical supply to an auxiliary field-coil of such machine, a reversing-switch for reversing the relation of armature and field, and contacts and brushes for coupling them as a generator to an electric circuit.

5. In an electric-brake system, the combination of means for placing the motor in operative connection with a source of electrical supply so as to be driven as a motor, contacts for connecting the source of electrical supply to an auxiliary field-coil of such machine, a reversing-switch for reversing the relation of armature and field, and contacts and brushes for coupling them as a generator to an electric circuit and including in said circuit a regulating device.

6. In an electric-brake system, the combination of means for placing the motor in operative connection with a source of electrical supply so as to be driven as a motor, contacts for connecting the source of electrical supply to an auxiliary field-coil of such machine, a reversing-switch for reversing the relation of armature and field, contacts and brushes for coupling them as a generator to an electric circuit, and means for automatically coupling the auxiliary field-coil to the armature-circuit whenever the flow of current in the main source falls below a predetermined amount.

7. In an electric-brake system, the combination of means for placing a motor in operative connection with a source of electric supply, contacts for including the source of electric supply with an auxiliary field-coil only of the motor, a short-circuiting device for cutting out the brake-magnets at a predetermined time, a reversing-switch, and means for opening the short circuit around the brake-magnets.

8. In an electric-brake system, the combination of a motor having main and auxiliary field-coils with contacts for including the auxiliary field in the trolley-circuit when the motor is not propelling the car.

9. In an electric-brake system, the combination of a dynamo-electric machine for propelling and braking the vehicle, an auxiliary field-coil for maintaining the field magnetization, and automatic means for shifting the connections of the field-coil from the main source of supply to the armature of the dynamo-electric machine.

10. In an electric motor, for propelling and braking the vehicle, the combination of main and auxiliary field-coils, and means for connecting the auxiliary field-coil to the main source of supply or the motor-armature.

11. In an electric motor, for propelling and braking a vehicle, the combination of main and auxiliary field-coils, and current-controlled means for shifting the connections of the auxiliary field-coil from the source of supply to the armature of the motor upon failure of said source.

12. In an electric-brake system, the combination of a controller for regulating the supply of energy to the motors and the brakes, an auxiliary field-coil on the motor for maintaining a certain amount of field magnetization, contacts for including this coil in circuit with the source of supply, and a current-controlled device for shifting the connections from one source to another upon failure of the first.

13. The combination of an electric motor having main and auxiliary field-coils, means for reversing the relation between the armature and fields, and automatic means for shifting the connections of the auxiliary field-coil from one source of supply to another.

14. In a controller for electric motors, the combination of contacts for regulating the supply of energy to the power side of the system, contacts for regulating the supply of energy to the brake side of the system, brushes and connections for establishing various combinations in the circuit relations, certain of the brushes making contact with one side of the system when the circuit is interrupted, and automatic means for changing the connections of the auxiliary field-coils from the source of supply to the armatures of the motors upon failure of the said source.

15. The combination with a dynamo-electric machine, of main and auxiliary field-coils, contacts for establishing circuit relations between the source of supply and the dynamo-electric machine, contacts for establishing circuit relations between the dynamo-electric machine and brakes, and current-controlled means for automatically changing the auxiliary field-coil from the trolley-circuit to the armature of the dynamo-electric machine.

16. In an electric-brake system, the combination of contacts for regulating the supply of energy to the brakes, brushes in engagement with certain of the contacts in the off position of the controller, and automatic means for changing the circuit relations at the time the controller is in the off position.

17. In an electric-brake system, the combination of a controller for regulating a motor used to propel or brake a vehicle, main and auxiliary field-coils on the motor, automatic means for changing the connections of the auxiliary field-coil, and means for interrupting the circuit relation of the auxiliary field-coil and armature when the motor is propelling the car.

18. In an electric-brake system, the combination of a controller for regulating the supply of current to a dynamo-electric machine when propelling or braking a car, main and auxiliary field-coils on the dynamo-electric machine, and automatic means carried by the controller for shifting the connections of the auxiliary field-coil from the trolley to the armature of the dynamo-electric machine.

19. In an electric-brake system, the combination of a dynamo-electric machine having main and auxiliary field-coils, contacts for including the auxiliary field-coil in either the trolley or the armature circuit, and a shunting device for the brake-magnets for preventing their acting at a certain time.

20. In an electric-brake system, the combination of a motor having main and auxiliary field-coils, a controller for regulating the energy of the system, current-controlled means for including the auxiliary field-coil in circuit with the source of supply or the motor-armature, and a device for momentarily shunting the brake-magnets before the current from the motor-armature is supplied thereto for the purpose of braking the vehicle.

ELMER A. SPERRY.

Witnesses:
S. BRASHEARS, Jr.,
WILLIAM CALVER.